(12) United States Patent
Hirota et al.

(10) Patent No.: US 11,851,110 B2
(45) Date of Patent: Dec. 26, 2023

(54) VEHICLE

(71) Applicants: TOYOTA JIDOSHA KABUSHIKI KAISHA, Toyota (JP); SUBARU CORPORATION, Tokyo (JP)

(72) Inventors: Takuya Hirota, Toyota (JP); Naoki Takahashi, Miyoshi (JP)

(73) Assignees: TOYOTA JIDOSHA KABUSHIKI KAISHA, Toyota (JP); SUBARU CORPORATION, Tokyo (JP)

(*) Notice: Subject to any disclaimer, the term of this patent is extended or adjusted under 35 U.S.C. 154(b) by 0 days.

(21) Appl. No.: 17/485,951

(22) Filed: Sep. 27, 2021

(65) Prior Publication Data

US 2022/0111910 A1 Apr. 14, 2022

(30) Foreign Application Priority Data

Oct. 14, 2020 (JP) .................................. 2020-173410

(51) Int. Cl.
*B62D 25/20* (2006.01)
*B60K 1/04* (2019.01)
*B62D 27/02* (2006.01)
*B62D 27/06* (2006.01)
*B62D 25/02* (2006.01)

(52) U.S. Cl.
CPC ............ *B62D 25/2036* (2013.01); *B60K 1/04* (2013.01); *B62D 25/025* (2013.01); *B62D 27/026* (2013.01); *B62D 27/065* (2013.01); *B60K 2001/0438* (2013.01)

(58) Field of Classification Search
CPC .............. B62D 25/025; B62D 25/2036; B62D 27/065; B62D 27/026; B60K 1/04; B60K 2001/0438

USPC .......................... 296/204, 209, 35.1, 35.3, 29
See application file for complete search history.

(56) References Cited

U.S. PATENT DOCUMENTS

| 2,208,709 A | * | 7/1940 | Tjaarda ................. B62D 21/11 |
| | | | 180/362 |
| 10,597,081 B2 | * | 3/2020 | Ayukawa ........... B62D 25/2018 |
| 2018/0236863 A1 | | 8/2018 | Kawabe et al. |
| 2019/0009662 A1 | | 1/2019 | Toyota |

(Continued)

FOREIGN PATENT DOCUMENTS

| CN | 109203955 A | 1/2019 |
| JP | 2003-182378 A | 7/2003 |
| JP | 2017-196959 A | 11/2017 |

(Continued)

*Primary Examiner* — Dennis H Pedder
(74) *Attorney, Agent, or Firm* — Dinsmore & Shohl LLP

(57) ABSTRACT

A vehicle has a vehicle body provided with a pair of rockers, the rockers each being provided on one side of a floor panel in a right-left direction and on another side of the floor panel in the right-left direction. The vehicle has a battery pack that is disposed below the floor panel, and that stores electric power to be supplied to a traveling motor. The vehicle has a pair of fixing members, the fixing members each being disposed on one side of the battery pack in the right-left direction and another side of the battery pack in the right-left direction, that is configured to fix the battery pack to the rockers. The vehicle has an elastic member disposed between the battery pack and the fixing members. The elastic member is disposed in a state compressed by the battery pack and the fixing members.

16 Claims, 5 Drawing Sheets

(56) References Cited

U.S. PATENT DOCUMENTS

2019/0263276 A1    8/2019   Otoguro et al.

FOREIGN PATENT DOCUMENTS

| JP | 2018-131136 A | | 8/2018 | |
|---|---|---|---|---|
| JP | 2019014349 A | * | 1/2019 | ............... B60K 1/04 |
| JP | 2019-142421 A | | 8/2019 | |

* cited by examiner

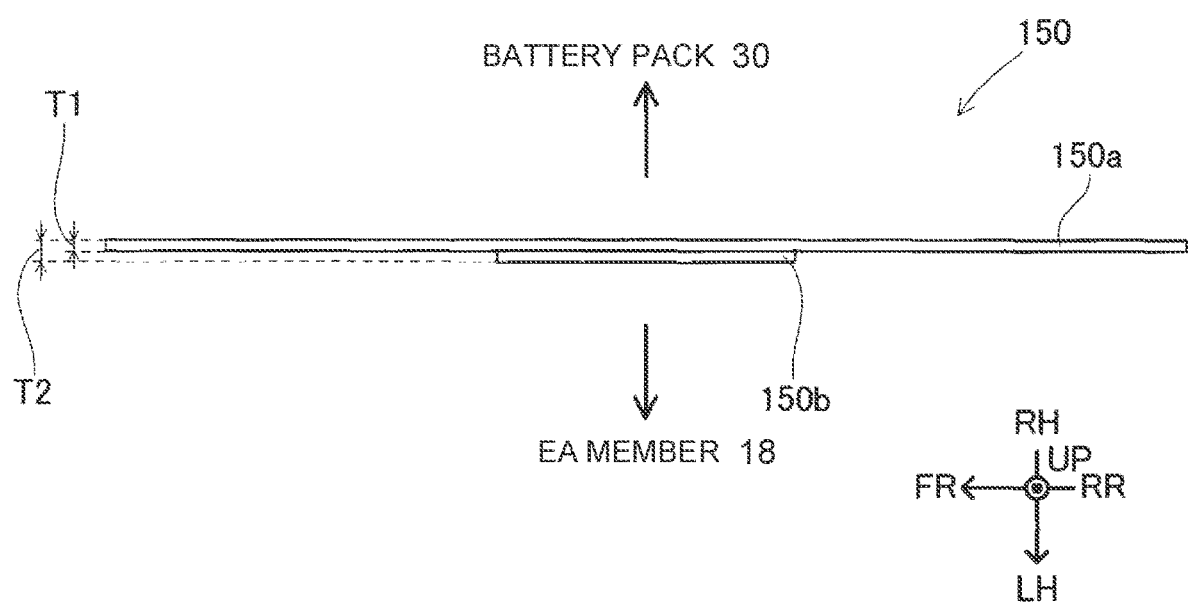

VEHICLE

CROSS-REFERENCE TO RELATED APPLICATION

This application claims priority to Japanese Patent Application No. 2020-173410 filed on Oct. 14, 2020, incorporated herein by reference in its entirety.

BACKGROUND

1. Technical Field

The technology disclosed in the present specification relates to a vehicle, and particularly relates to a vehicle provided with a battery pack below a floor panel.

2. Description of Related Art

Japanese Unexamined Patent Application Publication No. 2019-142421 (JP 2019-142421 A) describes a vehicle having a traveling motor. This vehicle is provided with a vehicle body in which a pair of rockers is provided on either side of a floor panel. Also, a battery pack that stores electric power to be supplied to the traveling motor is disposed below the floor panel.

SUMMARY

In this type of vehicle base structure, there are cases in which a pair of fixing members is used to fix the battery pack to the rockers. The fixing members are disposed on the both sides of the battery pack, in the right-left direction. There are cases in which both sides of the battery pack and the fixing members are fastened by a fastening member, in order to improve attachability and detachability of the battery pack. However, using nothing more than a simple fastening mechanism may allow the battery to vibrate when traveling.

The technology disclosed in the present specification is embodied in a vehicle that has a traveling motor. This vehicle has a vehicle body provided with a pair of rockers, the rockers each being provided on one side of a floor panel in a right-left direction and on another side of the floor panel in the right-left direction. The vehicle has a battery pack that is disposed below the floor panel, and that is configured to store electric power to be supplied to the traveling motor. The vehicle has a pair of fixing members, the fixing members each being disposed on one side of the battery pack in the right-left direction and on another side of the battery pack in the right-left direction, that is configured to fix the battery pack to the rockers. The vehicle has an elastic member disposed between the battery pack and the fixing members. The vehicle has a fastening member that fastens the battery pack and the fixing members. The elastic member is disposed in a state compressed by the battery pack and the fixing members.

By disposing the elastic member in a compressed state between the battery pack and the fixing members, the battery pack can be elastically supported by the elastic member. Supporting rigidity can be improved, and accordingly a fastening structure capable of suppressing vibration of the battery pack can be realized.

The fastening member may include a first bolt that is disposed at a front-side end portion of the fixing members in a vehicle-length direction, and a second bolt disposed at a rear-side end portion of the fixing members in the vehicle-length direction. The battery pack and the fixing members can be fastened by the first and the second bolts.

The elastic member may be a single member extending from a proximity of the first bolt to a proximity of the second bolt. Gaps between the battery pack and the fixing members can be sealed by the elastic member. A region from the proximity of the first bolt to the proximity of the second bolt can be sealed in a state with no gaps in the vehicle-length direction. This enables suppression of foreign matter, water, and so forth, from entering into gaps between the battery pack and the fixing members.

The battery pack may be provided with a first side face facing the fixing members. The battery pack may further be provided with a flange portion that protrudes from the first side face in a vehicle-width direction and that is disposed between the first bolt and the second bolt. The fastening member may include a coupling member that couples the flange portion and an upper face or a lower face of the fixing members. The coupling rigidity of the battery pack and the fixing members can be increased.

The fixing members may be provided with a second side face that faces the battery pack. A width of the elastic member in a vehicle up-down direction may be no less than a width of the second side face in the vehicle up-down direction. The second side face can be sealed over the entire region of the width in the vehicle up-down direction.

The elastic member may be joined by adhesive to one side of one of the battery pack and the fixing members. The elastic member can be integrated with one of the battery pack and the fixing members. Handleability when assembling or disassembling can be improved.

The elastic member may have a thickness in the vehicle-width direction. A thickness of a middle portion of the elastic member in the vehicle-length direction may be greater as compared to a thickness at a front-side end portion and at a rear-side end portion in the vehicle-length direction. Even when the external force applied to the elastic member is lower at the middle portion as compared to at the front-side end portion and at the rear-side end portion in the vehicle-length direction, the compression stress can be made to be uniform over the vehicle-length direction.

The elastic member may include rubber. Rubber can impart elasticity to the elastic member.

A compression stress applied to the elastic member may be a value no greater than a compression critical strength of the elastic member. Deterioration of the elastic member can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram illustrating an elastic member 150 according to a third embodiment.

DETAILED DESCRIPTION OF EMBODIMENTS

First Embodiment

Configuration of Vehicle

Figure 1:
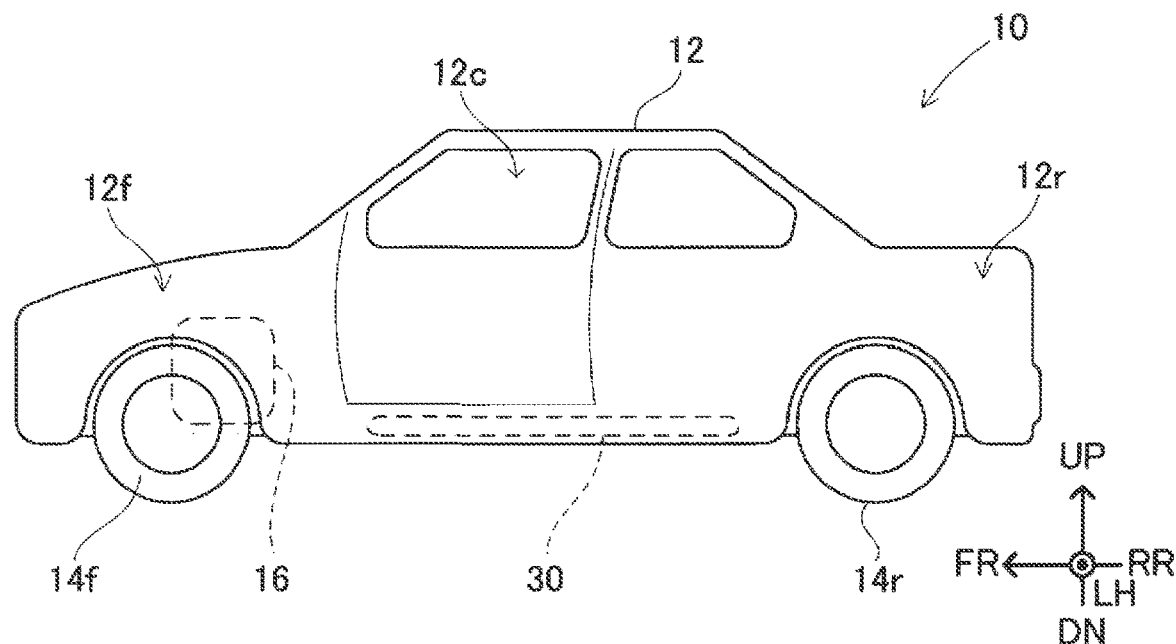
FIG. 1 is a left-side view of a vehicle 10.

FIG. 1 is a left-side view of a vehicle 10. The vehicle 10 according to a first embodiment is a so-called automobile, and is a vehicle that travels over a road surface. Note that the direction FR in FIG. 1 indicates forward in the front-rear direction (vehicle-length direction) of the vehicle 10, and the direction RR indicates rearward in the front-rear direction of the vehicle 10. Also, the direction LH indicates leftward in the right-left direction (vehicle-width direction) of the vehicle 10, and the direction RH indicates rightward in the right-left direction of the vehicle 10. The direction UP indicates upward in the up-down direction (vehicle-height direction) of the vehicle 10, and the direction DN indicates downward in the up-down direction of the vehicle 10. Note that in the present specification, the front-rear direction, the right-left direction, and the up-down direction, of the vehicle 10 may be referred to simply as the front-rear direction, the right-left direction, and the up-down direction, respectively.

The vehicle 10 is provided with a vehicle body 12, a plurality of wheels 14f and 14r, a traveling motor 16, and a battery pack 30. Note that the number of the wheels 14f and 14r is not limited to four. The vehicle body 12 can be primarily sectioned into a cabin 12c in which a user rides, a front portion 12f situated forward of the cabin 12c, and a rear portion 12r situated rearward of the cabin 12c.

The traveling motor 16 is connected to a pair of front wheels 14f, and drives the front wheels 14f. The battery pack 30 is a power source for the traveling motor 16, and stores electric power to be supplied to the traveling motor 16. The battery pack 30 is electrically connected to the traveling motor 16 via power supply circuits (omitted from illustration) such as a direct current (DC)-DC converter, an inverter, and so forth. The vehicle 10 may also have another prime mover such as an engine, in addition to or instead of the traveling motor 16.

Figure 2:
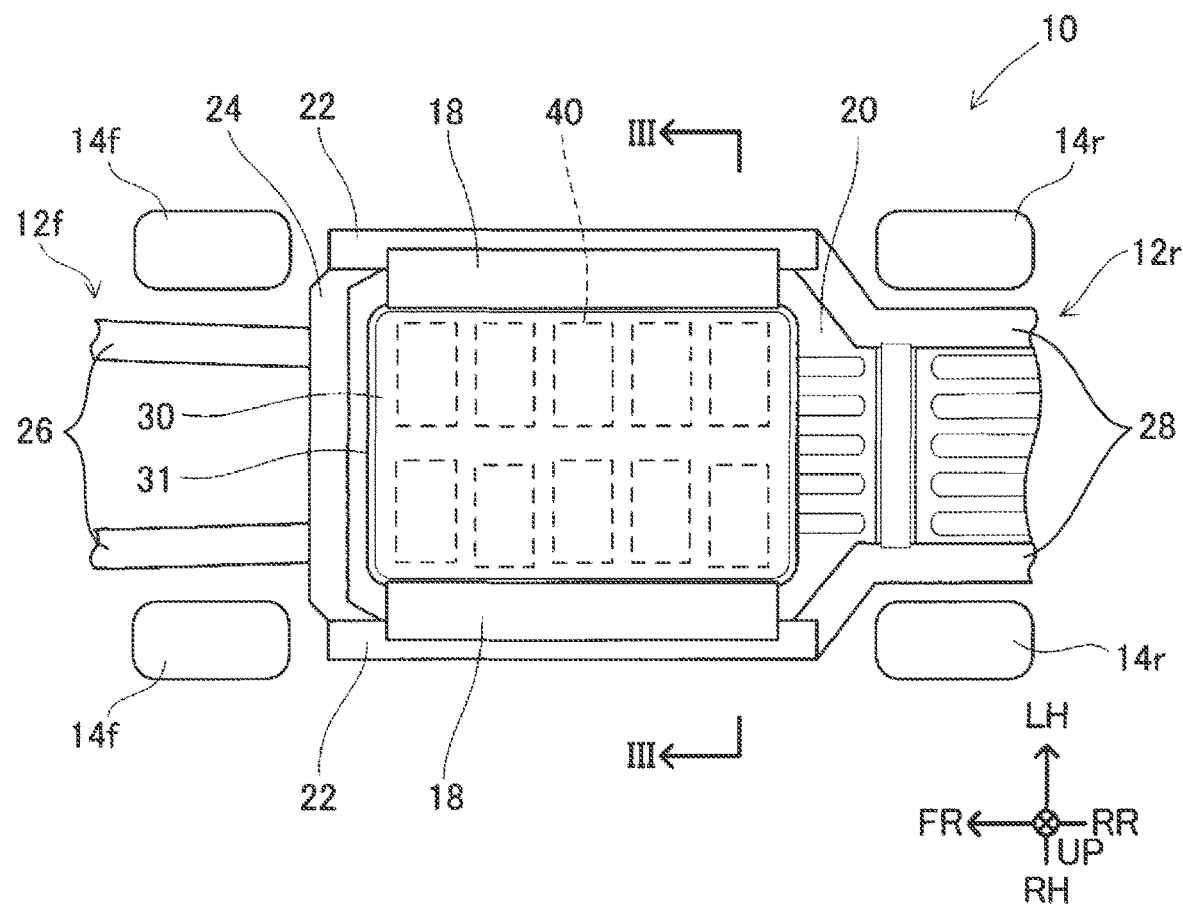
FIG. 2 is a bottom view of the vehicle 10.

FIG. 2 is a bottom view schematically illustrating main structures of the vehicle 10. The vehicle body 12 is provided with a floor panel 20, a pair of rockers 22, a dash cross member 24, a pair of front side members 26, and a pair of rear side members 28. The floor panel 20 is a plate-like member that extends in the front-rear direction and the right-left direction, and that makes up a floor of the cabin 12c. The rockers 22 (also referred to as "side sills") are positioned at the cabin 12c, and are provided on both sides of the floor panel 20 in the right-left direction. Each of the rockers 22 has a generally tubular structure extending in the front-rear direction, and making up part of a framework of the vehicle body 12. The front ends of the rockers 22 are connected to the dash cross member 24, and the rear ends of the rockers 22 are connected to the rear side members 28.

The dash cross member 24 is positioned at a boundary between the cabin 12c and the front portion 12f, and extends from the front end of one rocker 22 to the front end of the other rocker 22. The dash cross member 24 has a generally tubular structure extending in the right-left direction, and making up part of the framework of the vehicle body 12. The front side members 26 are positioned in the front portion 12f, and extend forward from the dash cross member 24. Each of the front side members 26 has a generally tubular structure extending in the front-rear direction, and making up part of the framework of the vehicle body 12. The rear side members 28 are positioned in the rear portion 12r, and extend rearward continuing from the rockers 22. Each of the rear side members 28 has a generally tubular structure extending in the front-rear direction, and making up part of the framework of the vehicle body 12.

The battery pack 30 is disposed below the floor panel 20 of the vehicle body 12, and is fixed to the rockers 22 with a pair of energy absorber (EA) members 18 interposed therebetween. That is to say, the EA members 18 are a pair of fixing members for fixing the battery pack 30 to the rockers 22. The EA members 18 each extend in the front-rear direction on both sides of the battery pack 30 in the right-left direction. The EA members 18 are members for absorbing energy at the time of a collision, and are configured to exhibit predetermined plastic deformation in accordance with the collision load. The material and structure of the EA members 18 are not limited in particular. The EA members 18 according to the present embodiment are configured of an aluminum material, as one example.

Structure of Battery Pack and EA Members

Figure 3:
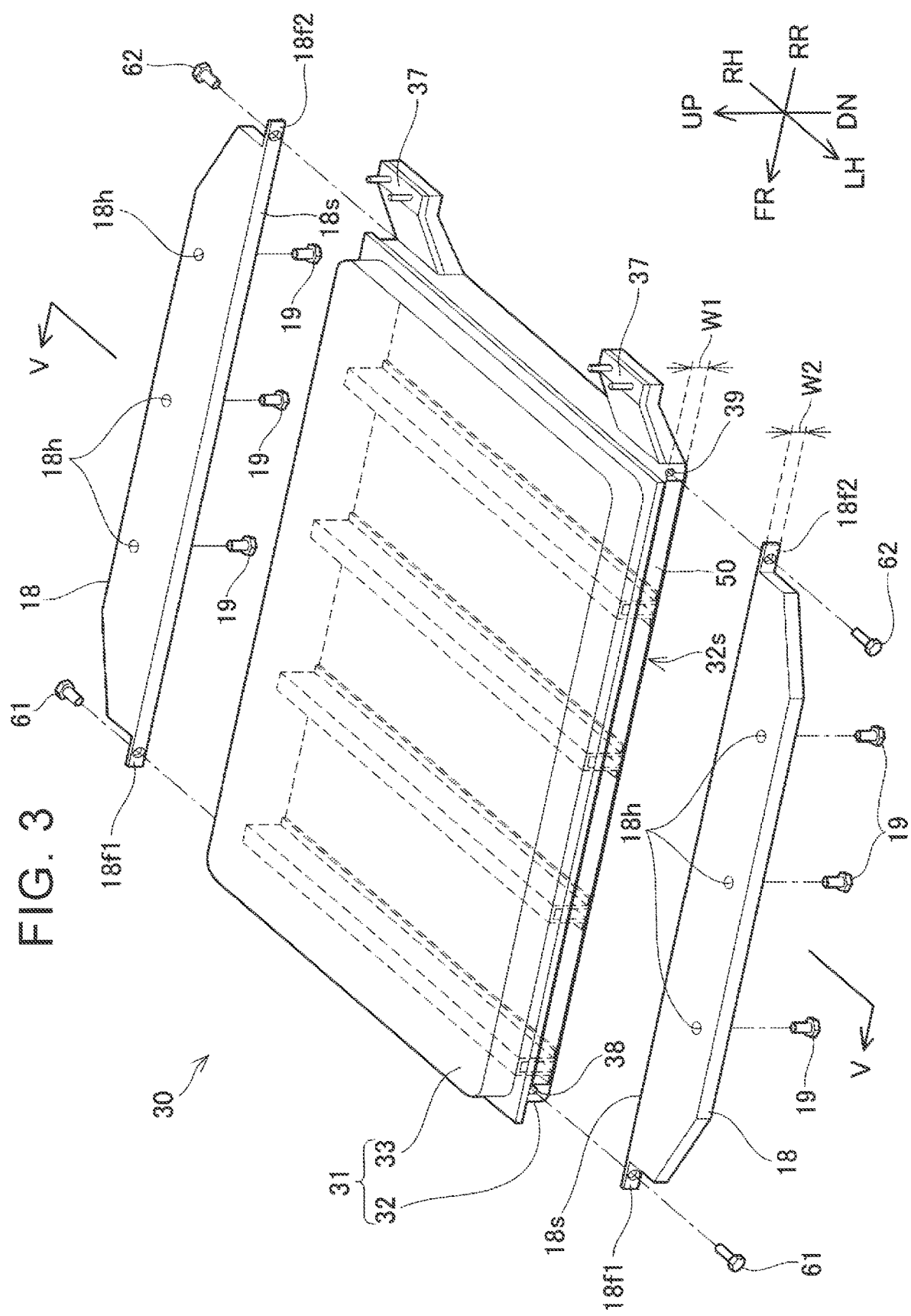
FIG. 3 is a disassembled perspective view of a battery pack 30 and an energy absorber (EA) member 18.
Figure 4:
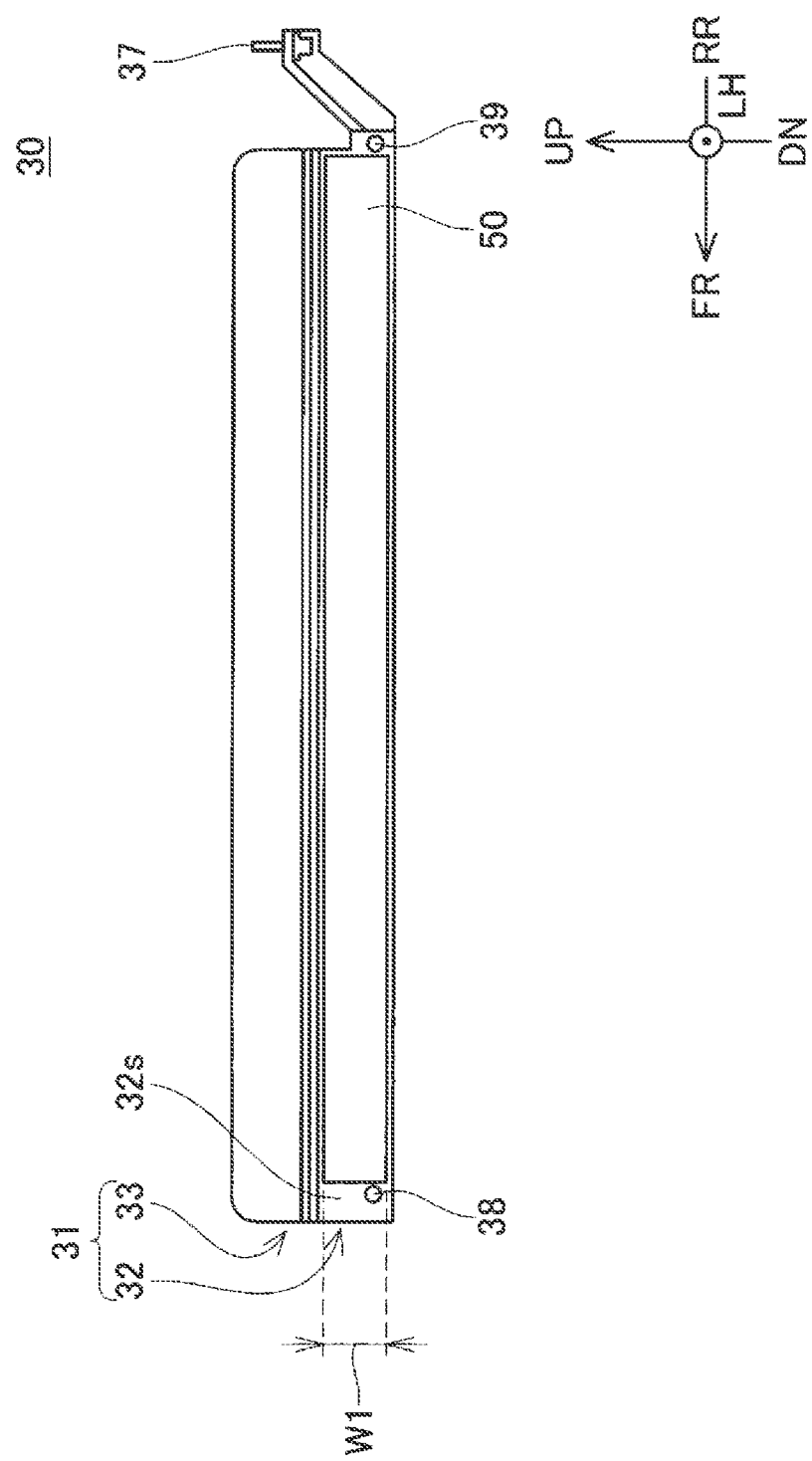
FIG. 4 is a side view of the battery pack 30 according to a first embodiment.
Figure 5:
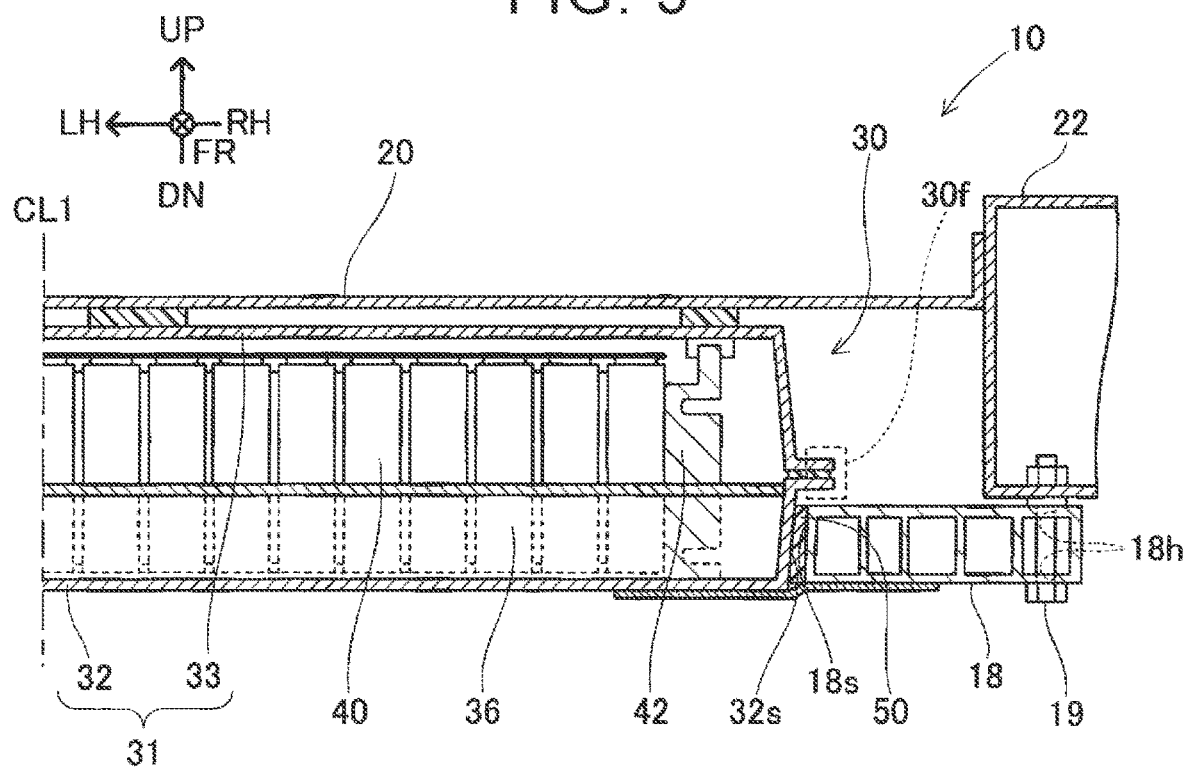
FIG. 5 is a cross-sectional view taken along line V-V in FIG. 3.

FIG. 3 is a disassembled perspective view of the battery pack 30 and the EA members 18. In-pack cross members 36 that are hidden by an upper-side case 33 are indicated by dashed lines in FIG. 3. FIG. 4 is a side view of the battery pack 30. FIG. 5 is a cross-sectional view, taken along line V-V in FIG. 3. Line V-V is a line passing through a substantial midpoint of the length of the EA members 18 in the vehicle-length direction. FIG. 5 is a diagram illustrating a state in which the battery pack 30, the EA members 18, and the rockers 22 are all assembled. The structure is symmetrical in the right-left direction, and accordingly only one side of a center line CL1 is illustrated in FIG. 5.

The battery pack 30 is provided with a case 31, a plurality of battery cells 40, and end plates 42. The case 31 is a member that makes up an outer shell of the battery pack 30. The case 31 is provided with a lower-side case 32, the upper-side case 33, the in-pack cross members 36, fixing mechanisms 37, and bolt holes 38 and 39. The lower-side case 32 has a dish-like shape that is recessed to the lower side. The in-pack cross members 36 are provided inside the lower-side case 32, and extend in the vehicle-width direction. The in-pack cross members 36 are structural members for increasing the strength of the lower-side case 32, and are also referred to as "reinforcement". The upper-side case 33 has a lid-like shape that protrudes to the upper side. These two are joined by flange portions 30f (see FIG. 5), thereby forming an interior space. The fixing mechanisms 37 are members for fixing the battery pack 30 to the lower face of the vehicle body 12.

The battery cells 40 are stored in the interior space of the case 31, as illustrated in FIG. 5. Each of the battery cells 40 is a secondary battery cell such as a lithium-ion battery cell, for example, which is repeatedly chargeable by electric power supplied from an external power source and regenerative power from the traveling motor 16. The battery cells 40 are arrayed in rows in the right-left direction of the vehicle. The end plates 42 are plate-like members that extend in the up-down direction, and are disposed at the ends of the rows of the battery cells 40. The end plates 42 press the battery cells 40 in the direction of array thereof.

The lower-side case 32 has a pair of side faces 32s in the vehicle-width direction. Bolt holes 38 and 39 are disposed at each of front-side end portions and rear-side end portions of the side faces 32s. Elastic members 50 are joined to the side faces 32s of the lower-side case 32 by adhesive (e.g., pressure sensitive adhesive double coated tape). In other words, the elastic members 50 are disposed between the battery pack 30 and the EA members 18. The elastic members 50 are each a rubber sheet in the present embodiment. The elastic members 50 are each a single member that extends from the proximity of the bolt holes 38 to which first bolts 61 are joined, to the proximity of the bolt holes 39 to which second bolts 62 are joined. A width W1 of the elastic members 50 in the vehicle up-down direction is no less than a width W2 of side faces 18s of the EA members 18 in the vehicle up-down direction. Thus, the side faces 18s can be sealed by the elastic members 50 over the entire region of the width W2.

As illustrated in FIG. 3, the EA members 18 are provided with the side faces 18s, flange portions 18f1 and 18f2, and holes 18h. The side faces 18s are faces that face the side faces 32s of the battery pack 30. Flanges 18f1 and 18f2 are disposed on front end portions and rear end portions of the side faces 18s, respectively. The first bolts 61 pass through the flange portions 18f1 and are screwed into the bolt holes 38. The second bolts 62 pass through the flange portions 18f2 and are screwed into the bolt holes 39. Thus, the EA members 18 can be fastened to the lower-side case 32.

Fastening the EA members 18 and the battery pack 30 together causes the elastic members 50 to be clamped between the side faces 18s and the side faces 32s and to be compressed. In some embodiments, the compression stress applied to the elastic members 50 by fastening is a value no greater than the compression critical strength of the elastic members 50. Permanent setting of the elastic members 50 can be suppressed, and deterioration can be curbed.

Also, bolts 19 are passed through the holes 18h and are fixed to bolt holes (omitted from illustration) at the lower faces of the rockers 22. The EA members 18 can be fixed to the rockers 22. Thus, the battery pack 30 is supported by the EA members 18.

Advantages

In some embodiments, the coupling structure of the battery pack 30 and the EA members 18 is one in which attaching and detaching is easy, taking into consideration replacement of parts, recycling, and so forth. Also, the supporting rigidity of the EA members 18 supporting the battery pack 30 is high. The reason is that when supporting rigidity is insufficient, bouncing resonance of the battery pack 30 may occur when traveling over rough roads, causing a body of the battery pack 30 to come loose or the inner structure thereof to be broken. Another reason is that the battery pack 30 may vibrate during normal traveling, making the ride less comfortable. Structures in which the battery pack 30 and the EA members 18 are fastened by bolts can improve attachability and detachability in comparison with structures where the two are joined by adhesive or the like. However, supporting is carried out at points, which are the bolt-fastened portions, and accordingly there are cases in which support rigidity is insufficient. In the technology of the present specification, the battery pack 30 and the EA members 18 are fastened by bolts in a state with the elastic members 50 interposed between the battery pack 30 and the EA members 18. Accordingly, the battery pack 30 can be elastically supported by the elastic members 50, due to being able to dispose the elastic members 50 in a compressed state between the battery pack 30 and the EA members 18. In other words, compressing the elastic members 50 enables the elastic members 50 to be used as rigidity members connecting between the battery pack 30 and the EA members 18. In addition to support at points by the bolt-fastened portions, support at planes can be performed by the elastic members 50. Supporting rigidity can be increased, and thereby vibration of the battery pack 30 can be suppressed. Also, vibration transmissibility between the battery pack 30 and the EA members 18 can be suppressed by elastic supporting, and thus vibration can be suppressed. Disjoining the bolt fastenings enables the coupling of the battery pack 30 and the EA members 18 to be easily disengaged, and accordingly attachability and detachability can be improved.

Gaps between the side faces 32s of the battery pack 30 and the side faces 18s of the EA members 18 can be sealed by the elastic members 50. The elastic members 50 are single members, and accordingly the regions from the proximity of the first bolts 61 to the proximity of the second bolts 62 can be sealed in a state with no gaps in the vehicle-length direction. This enables suppression of foreign matter, water, and so forth, from entering into gaps between the two. Paint flaking and rusting can also be suppressed from occurring.

The elastic members 50 are joined to the side faces 32s of the battery pack 30 by adhesive. Thus, the elastic members 50 can be integrated with the battery pack 30. This enables handleability of the elastic members 50 when assembling or disassembling the battery pack 30 and EA members 18 to be improved.

Second Embodiment

Figure 6:
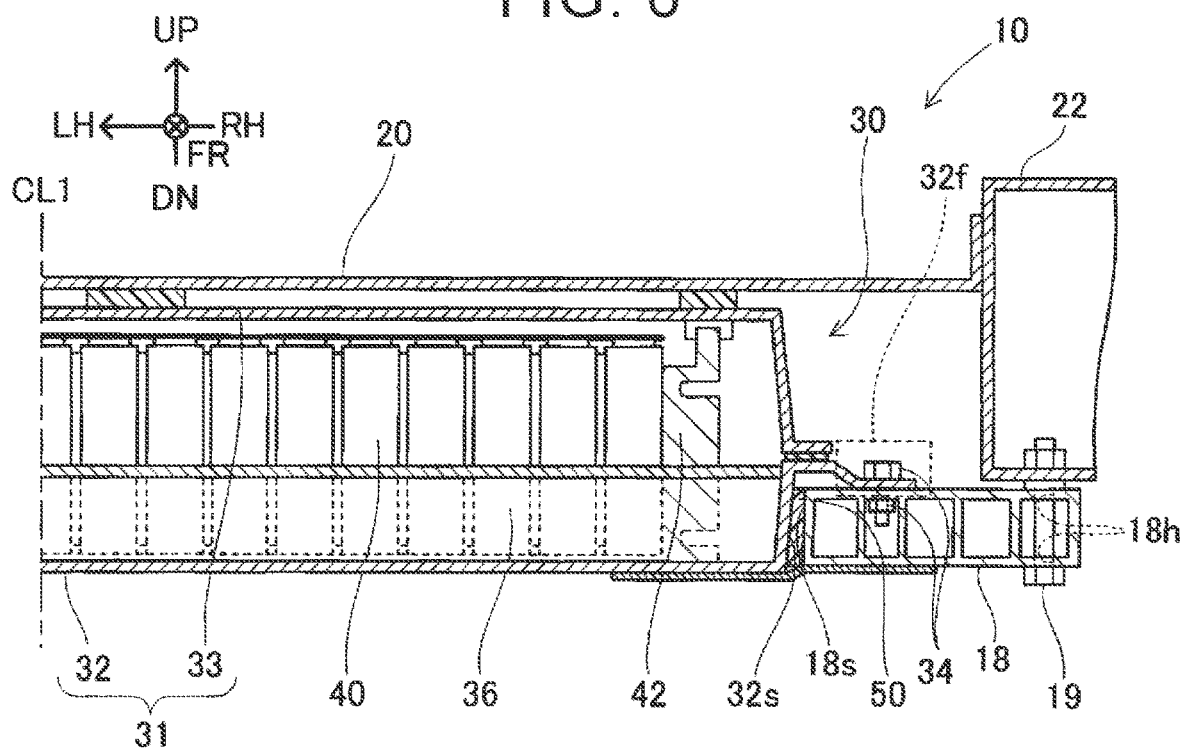
FIG. 6 is a cross-sectional view illustrating a fastening structure according to a second embodiment.

FIG. 6 illustrates a fastening structure of the battery pack 30 and the EA members 18 in a second embodiment. FIG. 6 is a diagram corresponding to FIG. 5 in the first embodiment. Note that parts the same as in the first embodiment are denoted by the same signs, and description will be omitted. This is true for the other embodiments below as well.

The battery pack 30 further is provided with fastening flange portions 32f protruding from the side faces 32s in the vehicle lateral direction. The fastening flange portions 32f are coupled to the upper faces of the EA members 18 by coupling members 34. The coupling members 34 are bolts and nuts in the present embodiment. The positions of disposing the fastening flange portions 32f in the vehicle-length direction may be set at any position, as long as the positions are between the bolt holes 38 to which first bolts 61 are fastened and the bolt holes 39 to which second bolts 62 are fastened. The number of fastening flange portions 32f disposed on each side face 32s is not limited to one, and may be a plurality.

In the structure according to the first embodiment, fastening portions are disposed on both ends of the EA members 18, in the form of the first bolts 61 and the second bolts 62. In the structure according to the second embodiment, fastening portions can be further disposed at intermediate points on the EA members 18, as well. This enables the coupling rigidity between the battery pack 30 and the EA members 18 to be increased.

Third Embodiment

FIG. 7 illustrates an elastic member 150 according to a third embodiment. FIG. 7 is a diagram viewing the elastic member 150 from above the vehicle. The battery pack 30 (omitted from illustration) is situated on the upper side in the plane of the drawing, and the EA member 18 (omitted from illustration) is situated on the lower side in the plane of the drawing.

The elastic member 150 has a configuration in which a first elastic member 150a and a second elastic member 150b are layered in the vehicle-width direction. The first elastic member 150a extends from the proximity of the bolt holes 38 (omitted from illustration) to the proximity of the bolt holes 39 (omitted from illustration). The second elastic member 150b is shorter in the vehicle-length direction than the first elastic member 150a. The second elastic member 150b is disposed in the proximity of the center portion of the first elastic member 150a in the vehicle-length direction. A front-side end portion and a rear-side end portion of the elastic member 150 in the vehicle-length direction has a thickness T1. The middle portion of the elastic member 150 in the vehicle-length direction has a thickness T2 that is greater than the thickness T1.

In the structure according to the first embodiment, fastening portions are disposed on both ends of the EA members 18, in the form of the first bolts 61 and the second bolts 62. In such an arrangement, there are cases in which the external force in the compression direction applied to the elastic members 50 is lower at the middle portion as compared to both ends. In the elastic member 150 according to the third embodiment, a thickness of the elastic member can be increased in the proximity of the middle portion at which external force drops. Thus, the compression stress generated at the elastic member 150 can be made to be uniform over the vehicle-length direction. A situation in which both end portions of the elastic member deteriorate due to concentration of stress can be suppressed.

Although embodiments have been described above in detail, these are only exemplifications, and do not limit the Claims. The technology set forth in the Claims includes various modifications and alterations of the specific example exemplified above. Technical elements described in the present specification or the drawings exhibit technical utility, either singularly or through various types of combinations, and do not limit combinations set forth in the Claims at the time of application. Also, the technology exemplified in the present specification or the drawings may achieve a plurality of objects simultaneously, and achieving one of these objects in itself has technical utility.

Modifications

The material of the elastic members 50 and 150 is not limited to rubber; rather, elastic members of various compositions can be used.

The elastic members 50 may be joined to the side faces 18s of the EA members 18 by adhesive.

The form of changing the thickness of the elastic member 150 in the third embodiment is not limited to a layered structure. The thickness may be changed in a single-layer structure.

The EA members 18 are an example of a fixing member. The first bolts 61 and the second bolts 62 are an example of a fastening member.

What is claimed is:

1. A vehicle including a traveling motor, the vehicle comprising:
   a vehicle body provided with a pair of rockers, the rockers each being provided on one side of a floor panel in a right-left direction and on another side of the floor panel in the right-left direction;
   a battery pack that is disposed below the floor panel, and that is configured to store electric power to be supplied to the traveling motor;
   a pair of fixing members, the fixing members each being disposed on one side of the battery pack in the right-left direction and on another side of the battery pack in the right-left direction, that is configured to fix the battery pack to the rockers;
   an elastic member disposed between the battery pack and the fixing members; and
   a fastening member that fastens the battery pack and the fixing members,
   wherein the fastening member includes a first bolt that is disposed at a front-side end portion of the fixing members in a vehicle-length direction, and a second bolt disposed at a rear-side end portion of the fixing members in the vehicle-length direction,
   wherein the elastic member is disposed in a state compressed by the battery pack and the fixing members, and
   wherein the elastic member is a single member extending from a proximity of the first bolt to a proximity of the second bolt.

2. The vehicle according to claim 1,
   wherein the battery pack is provided with a first side face facing the fixing members,
   wherein the battery pack is further provided with a flange portion that protrudes from the first side face in a vehicle-width direction and that is disposed between the first bolt and the second bolt, and
   wherein the fastening member includes a coupling member that couples the flange portion and an upper face or a lower face of the fixing members.

3. The vehicle according to claim 1,
   wherein the fixing members are provided with a second side face that faces the battery pack, and
   wherein a width of the elastic member in a vehicle up-down direction is no less than a width of the second side face in the vehicle up-down direction.

4. The vehicle according to claim 1, wherein the elastic member is joined by adhesive to one side of one of the battery pack and the fixing members.

5. The vehicle according to claim 1,
   wherein the elastic member has a thickness in the vehicle-width direction, and
   wherein a thickness of a middle portion of the elastic member in a vehicle-length direction is greater as compared to a thickness at a front-side end portion and at a rear-side end portion in the vehicle-length direction.

6. The vehicle according to claim 1, wherein the elastic member includes rubber.

7. The vehicle according to claim 1, wherein a compression stress applied to the elastic member is a value no greater than a compression critical strength of the elastic member.

8. A vehicle including a traveling motor, the vehicle comprising:
   a vehicle body provided with a pair of rockers, the rockers each being provided on one side of a floor panel in a right-left direction and on another side of the floor panel in the right-left direction;
   a battery pack that is disposed below the floor panel, and that is configured to store electric power to be supplied to the traveling motor;
   a pair of fixing members, the fixing members each being disposed on one side of the battery pack in the right-left direction and on another side of the battery pack in the right-left direction, that is configured to fix the battery pack to the rockers;

an elastic member disposed between the battery pack and the fixing members; and a fastening member that fastens the battery pack and the fixing members, wherein the elastic member is disposed in a state compressed by the battery pack and the fixing members, wherein the fixing members are provided with a second side face that faces the battery pack, and wherein a width of the elastic member in a vehicle up-down direction is no less than a width of the second side face in the vehicle up-down direction.

9. The vehicle according to claim 8, wherein the elastic member is joined by adhesive to one side of one of the battery pack and the fixing members.

10. The vehicle according to claim 8, wherein the elastic member has a thickness in the vehicle-width direction, and wherein a thickness of a middle portion of the elastic member in a vehicle-length direction is greater as compared to a thickness at a front-side end portion and at a rear-side end portion in the vehicle-length direction.

11. The vehicle according to claim 8, wherein the elastic member includes rubber.

12. The vehicle according to claim 8, wherein a compression stress applied to the elastic member is a value no greater than a compression critical strength of the elastic member.

13. A vehicle including a traveling motor, the vehicle comprising:

a vehicle body provided with a pair of rockers, the rockers each being provided on one side of a floor panel in a right-left direction and on another side of the floor panel in the right-left direction;

a battery pack that is disposed below the floor panel, and that is configured to store electric power to be supplied to the traveling motor;

a pair of fixing members, the fixing members each being disposed on one side of the battery pack in the right-left direction and on another side of the battery pack in the right-left direction, that is configured to fix the battery pack to the rockers;

an elastic member disposed between the battery pack and the fixing members; and a fastening member that fastens the battery pack and the fixing members, wherein the elastic member is disposed in a state compressed by the battery pack and the fixing members, wherein the elastic member has a thickness in the vehicle-width direction, and wherein a thickness of a middle portion of the elastic member in a vehicle-length direction is greater as compared to a thickness at a front-side end portion and at a rear-side end portion in the vehicle-length direction.

14. The vehicle according to claim 13, wherein the elastic member is joined by adhesive to one side of one of the battery pack and the fixing members.

15. The vehicle according to claim 13, wherein the elastic member includes rubber.

16. The vehicle according to claim 13, wherein a compression stress applied to the elastic member is a value no greater than a compression critical strength of the elastic member.

* * * * *